Feb. 5, 1935. W. J. LAFFEY ET AL 1,990,335
TRUCK OR TRAILER BODY
Filed July 21, 1933   2 Sheets-Sheet 1
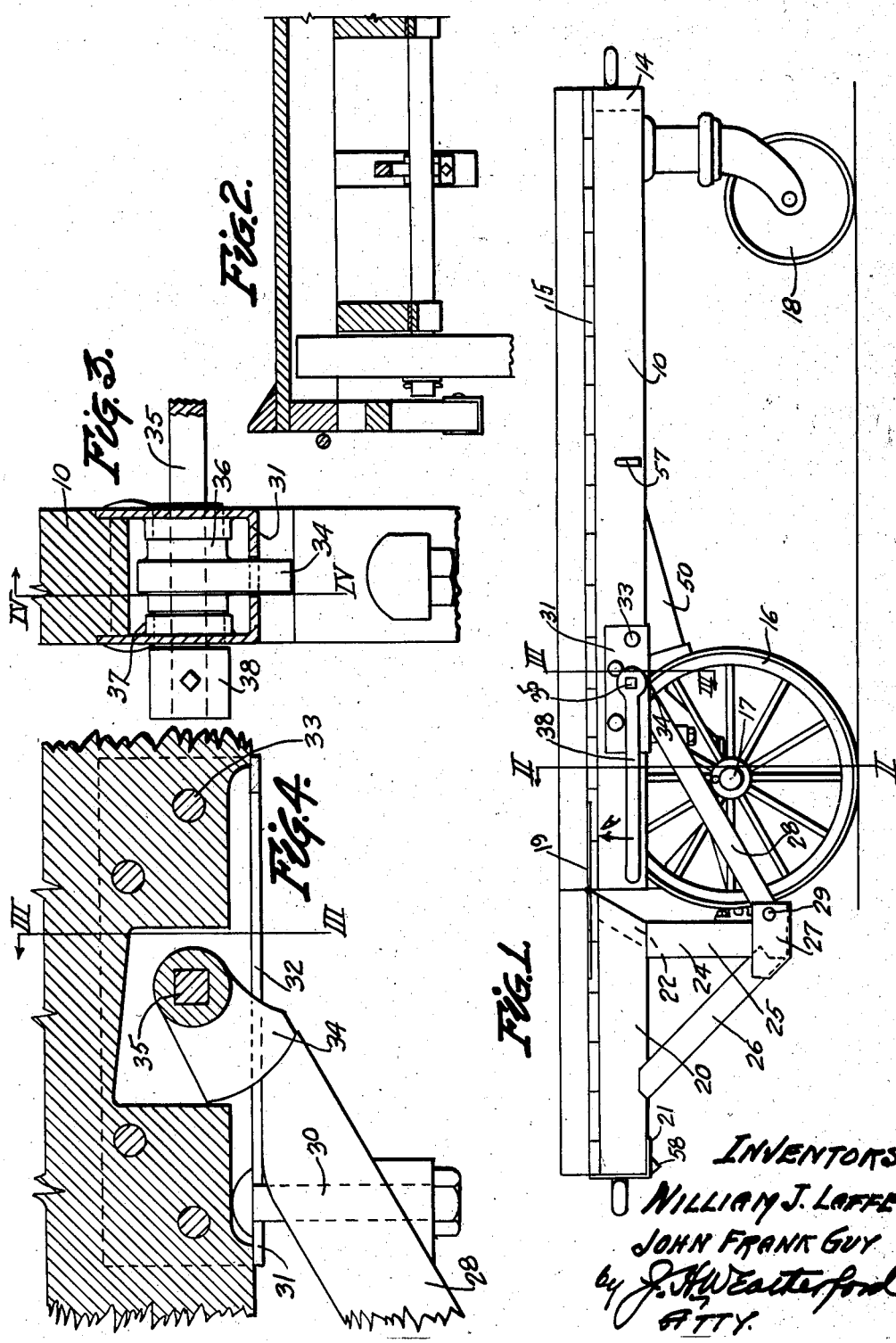

Feb. 5, 1935. W. J. LAFFEY ET AL 1,990,335
TRUCK OR TRAILER BODY
Filed July 21, 1933 2 Sheets-Sheet 2
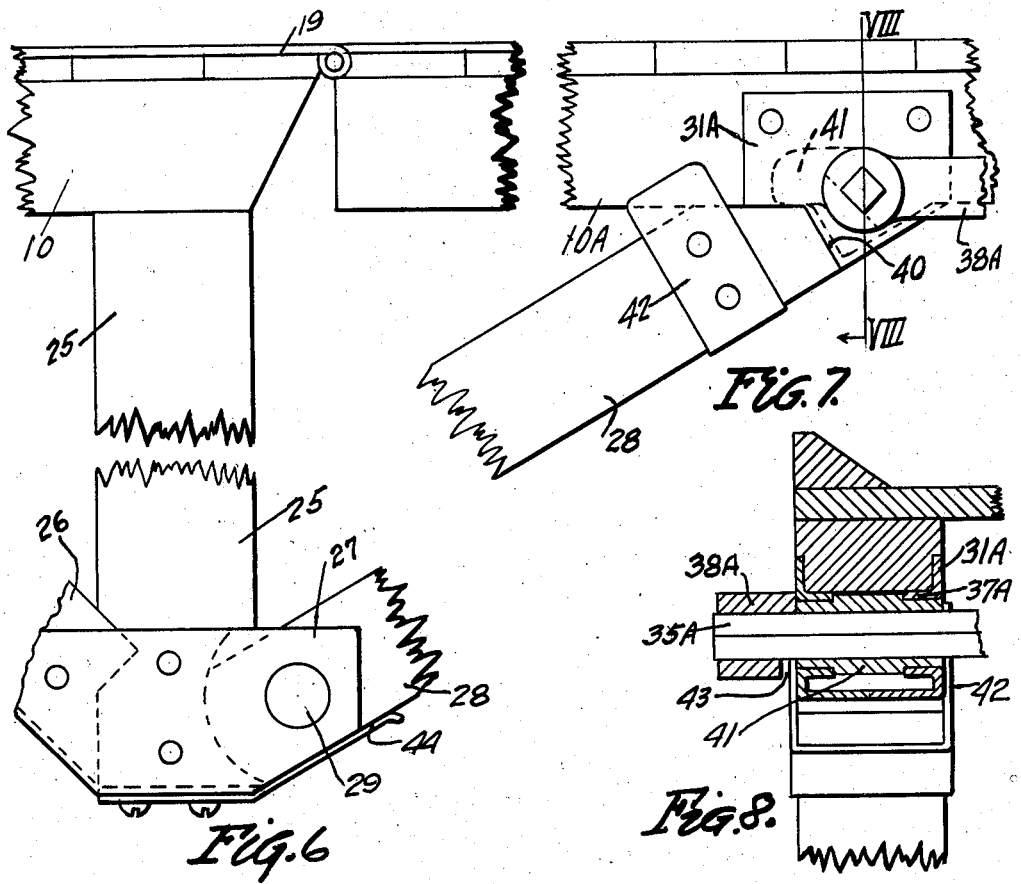
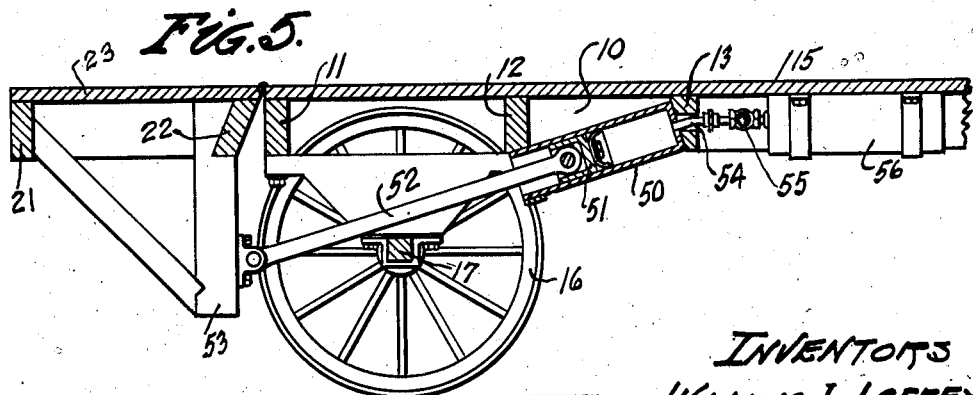
INVENTORS
WILLIAM J. LAFFEY
JOHN FRANK GUY Patented Feb. 5, 1935

1,990,335

UNITED STATES PATENT OFFICE 1,990,335

TRUCK OR TRAILER BODY

William J. Laffey, Memphis, and John Frank Guy, Whitehaven, Tenn.

Application July 21, 1933, Serial No. 681,470

6 Claims. (Cl. 280—49)

This invention relates to bodies or beds for trucks or trailers, particularly those which are used in warehouses or the like for the transfer of freight as between various parts of the warehouse or between cars and warehouse.

Trucks or trailers, which will be hereinafter for convenience referred to by the designation trucks, such as are used for the transfer of freight in warehouses and in similar use, ordinarily have a rectangular bed or platform some three feet wide and six feet long, the top of the platform being usually some eighteen inches above the floor. They ordinarily have one pair of wheels carried by a transverse axle rigidly secured to the platform and positioned about one-third the length of the body from its rear end, with a lighter pair of wheels or casters pivotally movable carrying the front end. Heavy freight placed upon these trucks if positioned too close to the rear end or brought too close in unloading, tends to up-end the truck and such unloading, is therefore usually done by handling the freight over one of the sides of the truck. Also, where trucks are used for unloading into freight cars, the width of the car so limits the receiving space that even though the end of the truck be supported, it is still often necessary to unload over the sides.

Whether unloaded from side or end, the package of freight is usually tipped over and manually lowered to the warehouse or car floor. Where bulky or otherwise inconvenient to handle, or where it is heavy, the package instead of being eased to the floor is often dropped, causing considerable damage, the damage usually not being reported, or coming to light, until it is too late to determine just where or how it did occur. Many of the trucks have ridges or rails along their sides which cause additional trouble in side unloading.

The objects of the present invention are to make a platform or floor portion for a device of this character in which a portion of the platform may be displaced angularly downward to assist in the discharge of freight from the device;

To provide means for supporting the displaceable portion;

To provide means for releasing the brace or support for such displaceable portion;

To provide means for checking the displacement speed; and

Generally improve the design and construction of such a device.

The means by which the foregoing and other objects are accomplished and the manner of their accomplishment will readily be understood from the following specification, on reference to the accompanying drawings, in which:—

Fig. 1 is a side elevation of a truck having a portion of its rear end hingedly attached, the hinge portion being shown as braced and supported in load carrying position;

Fig. 2 is a fragmentary transverse section taken as on the line II—II of Fig. 1;

Fig. 3 is a fragmentary sectional detail on an enlarged scale, taken as on the line III—III of Figs. 1 and 4, showing a brace latch and tripping mechanism;

Fig. 4 is a fragmentary section on the same scale taken as on the line IV—IV of Fig. 2, showing a side view of the same mechanism;

Fig. 5 is a longitudinal section along the center line of the truck, being the line V—V of Fig. 2, showing the mechanism for regulating the speed of the lowering movement;

Fig. 6 is a fragmentary side elevation on an enlarged scale, showing detail of the bracing post and members;

Figs. 7 and 8 are fragmentary views on an enlarged scale of a modified form of brace latch and the releasing mechanism therefor;

Fig. 7 being a side elevation of the upper end of the brace and its seat; and Fig. 8 a section taken on the line VIII—VIII of Fig. 7.

Referring now to the drawings, 10 are the side frames or rails of a truck platform, 11, 12 are the usual transverse end members, 13 and 14 intermediate transverse members, and 15 the floor. 16 are a pair of main wheels journalled on a transverse axle 17 secured to and supporting the truck body. 18 are the usual front casters. The above parts are in every way similar to usual practice except that the length of the body is shortened.

Hingedly connected to the rear end of this platform, as by hinges 19, is an extension platform preferably of identical width. 20 are side rails; 21, 22 transverse end members, and 23 the floor. The end member 22 is inclined and the ends of the side rails 20 are similarly beveled, the inclination and beveling extending from the pivot point of the hinges 19 to provide a space 24 which will permit the extension platform to swing downward. Secured to and extending downward from the side rails 20, are posts 25, the lower ends of which are secured to and braced by members 26 extending diagonally upward to the side rails. Secured at the lower end of the post 25, is a shoe 27, in which a brace arm 28 is hingedly secured as by a pin 29. Preferably the lower end of this arm abuts the side of the post 25, as shown in Fig. 6, so that the thrust of the arm is taken directly by the post as well as by the pin 29. The upper end of the arm 28, as shown in detail in Fig. 4, is supported by a bolt 30 which is slidably mounted in a U shaped shoe 31, the bottom of the shoe being provided with a slot 32 to receive the shank of the bolt. Preferably the shoe 31 is made in two halves which are secured to opposite sides of the side rail 10, as by rivets or bolts 33. The upper end of the arm 28 is adapted to abut against a latch 34 which is mounted on a rod 35 preferably square in cross section. The hubs 36, of the latch member 34, are journalled in bearings 37 formed integral with the side plates of the shoe 31. The rod 35 extends beyond the outer side of the shoe 31 and has secured on the outer end thereof a handle 38 by which it may be turned to disengage the latch 34 from the end of the brace 28. The construction of the brace arm, latch and other parts above described is identical on both sides of the truck, the rod 35 extending entirely across the truck whereby both latch members are actuated at the same time. A second handle may be placed on the opposite side of the truck if it be so desired. Upward movement of the arm 38 in the direction of the arrow A, Fig. 1, will disengage the latch 34 from the end of the brace arm.

In Figs. 7 and 8 a modification of the means for latching the open end of the arm 28 is shown. In this form, a shoe 31A is provided with an abutment 40 which takes the end thrust of the upper end of the arm 28. 38A is the handle which is mounted on the outer end of the transverse shaft 35A. This shaft carries a cam 41 the hubs of which are suitably journalled in bearings 37A formed integral with the side plates of the shoe 31A. When the handle 38A is raised, the cam 41 depresses the end of the brace arm 28 from engagement with the abutment 40 and permits movement of the arm to allow the hinged end of the truck platform to lower. 42 is a guide member, suitably secured to the arm 28, the arms of which member embrace the sides of the rail 10A to guide the end of the arm 28 in its movement. Since the depression of the arm end to clear the abutment 40 is not sufficient to permit the guide member 42 to pass the hub of the handle 38A a portion of the lower part of this hub is cut away as at 43. Preferably the arm 28 is resiliently held against the underside of the rail 10A as by a spring 44 (Fig. 6).

In order that the hinged end of the truck may not drop too suddenly when the brace arms are released, a centrally disposed hydraulic thrust cylinder 50 is provided, secured and braced to the truck body. 51 is a piston, 52 a thrust rod extending from said piston to a centrally disposed post 53 and preferably pin connected to both piston and post. The post is suitably braced to the underside of the platform. 54 is a pipe leading from the cylinder 50 through a control valve 55 to a reservoir 56. The valve 55 may be of definitely restricted area against such flow or may be opened and closed manually. If the valve is to be opened and closed by hand, a handle 57 (Fig. 1) for actuating the valve, is preferably provided exterior to the side rail 10 of the truck.

58 are sharpened points or calks which may be secured to the underside of the end rail 21, for the purpose of engaging the warehouse or car floor when the hinged end of the truck is lowered.

In use the truck is loaded and used in the usual manner and may also be unloaded in the same manner. Should it be desired however to make use of the hinged feature of the platform, the handle 38 or 38A as the case may be, is raised to disengage the latches 34 from the ends of the brace arms 28, or to disengage the ends of these arms from the abutments 40. When this is done the outer end of the hinged portion of the truck platform will descend as rapidly as flow from the cylinder 50 to the reservoir 56 will permit. If the load is carried largely upon the extension, or entirely thereon, it is usually advisable to manually resist the drop, as would be done were the load being taken off of the platform in usual manner. Should the load not be on the extension it may be shifted after lowering of the end and be allowed to slide downward to the floor. The points or calks 58 engage the floor and tend to prevent displacement of the truck during such unloading.

After unloading the outer end of the extension is raised by hand until the ends of the brace arms engage the cams 34, or the brace arms 40 as the case may be. Preferably the valve 55 is wide open during this action in order to provide more rapid flow from the reservoir to the cylinder, or a checked by-pass may be provided.

Having described our invention, what we claim is:

1. A truck or the like, including a wheel-supported platform, a relatively short extension of said platform, hingedly secured thereto, a braced structure extending downwardly from said extension, brace arms hingedly secured to the lower portion of said structure and extending diagonally upward therefrom adjacent the underside of said platform, means supporting said arms in such position, means establishing abutments for the upper ends of said arms, means effecting disengagement of the ends of said arms from said abutments, and means for guiding said arm-ends when so disengaged.

2. A truck or the like, including a wheel-supported platform, a relatively short extension of said platform, hingedly secured thereto, a braced structure extending downwardly from said extension, brace arms hingedly secured to the lower portion of said structure and extending diagonally upward therefrom adjacent the underside of said platform, means supporting said arms in such position, means establishing abutments for the upper ends of said arms, and manually actuatable cams for effecting disengagement of said arm-ends from said abutments.

3. A truck or the like, including a wheel-supported platform, a relatively short extension of said platform, hingedly secured thereto, a braced structure extending downwardly from said extension, brace arms hingedly secured to the lower portion of said structure and extending diagonally upward therefrom adjacent the underside of said platform, means supporting said arms in such position, means establishing abutments for the upper ends of said arms, manually actuatable cams for effecting disengagement of said arm-ends from said abutments, and means for guiding said arm-ends when so disengaged.

4. A truck or the like, including a wheel-supported platform, a relatively short extension of said platform, hingedly secured thereto, a braced structure extending downwardly from said extension, brace arms hingedly secured to the lower portion of said structure and extending diagonally upward therefrom adjacent the underside of said platform, means supporting said arms in such position, means establishing abutments for the upper ends of said arms, and manually actuatable means for effecting disengagement of said arm-ends from said abutments.

5. A truck or the like, including a wheel-supported platform, a relatively short extension of said platform hingedly secured thereto, a braced structure extending downwardly from said extension, brace arms extending diagonally upward from the lower portion of said structure adjacent the underside of said platform, means supporting said arms in such position, means establishing abutments for the respective upper and lower ends of said arms, manually actuatable cams for effecting disengagement of one set of said arm-ends from their respective said abutments, and means for guiding said arm-ends when so disengaged.

6. A truck or the like, including a wheel-supported platform, a relatively short extension of said platform, hingedly secured thereto, a braced structure extending downwardly from said extension, brace arms extending diagonally upward from the lower portion of said structure adjacent the underside of said platform, means supporting said arms in such position, means establishing abutments for the respective upper and lower ends of said arms, manually actuatable cams for effecting disengagement of one set of said arm-ends from their respective said abutments.

WILLIAM J. LAFFEY.
JOHN FRANK GUY.